US006616122B2

(12) United States Patent
Kobow et al.

(10) Patent No.: US 6,616,122 B2
(45) Date of Patent: Sep. 9, 2003

(54) ELECTROMAGNET SWITCHING DEVICE

(75) Inventors: Wolfgang Kobow, Wuppertal (DE); Michael Dettmers, Kamen (DE)

(73) Assignee: DBT GmbH (DE)

( * ) Notice: Subject to any disclaimer, the term of this patent is extended or adjusted under 35 U.S.C. 154(b) by 0 days.

(21) Appl. No.: 10/099,732

(22) Filed: Mar. 15, 2002

(65) Prior Publication Data

US 2002/0130745 A1 Sep. 19, 2002

(30) Foreign Application Priority Data

Mar. 17, 2001 (DE) .................................... 201 04 677 U

(51) Int. Cl.[7] ......................... F15B 13/044; F16K 31/06

(52) U.S. Cl. ............................. 251/129.18; 137/454.2; 137/454.6

(58) Field of Search ....................... 251/129.01–129.22; 137/454.2–454.6

(56) References Cited

U.S. PATENT DOCUMENTS 3,886,507 A 5/1975 Johnston et al.
3,936,030 A 2/1976 Putschky
4,108,420 A * 8/1978 West et al. ............ 251/129.08
4,971,115 A 11/1990 Tinholt
5,199,392 A * 4/1993 Kreuter et al. ......... 251/129.16
5,435,343 A * 7/1995 Buezis .................. 251/129.18
5,538,026 A * 7/1996 Kazi ..................... 251/129.08
5,575,309 A 11/1996 Connell
5,875,922 A * 3/1999 Chastine et al. ....... 251/129.15
6,098,653 A 8/2000 Kobow et al.
6,138,713 A * 10/2000 Nassar et al. .......... 251/129.14

FOREIGN PATENT DOCUMENTS

DE 41 40 233 A1 6/1992
JP 11-283828 A 10/1999

* cited by examiner

*Primary Examiner*—Paul J. Hirsch
(74) *Attorney, Agent, or Firm*—Cook,Alex,McFarron,Manzo,Cummings & Mehler, Ltd.

(57) ABSTRACT

An electromagnet switching device for hydraulic or electro-hydraulic directional control valves, especially applied in advancing supports of underground mining equipment with controllable electromagnets (10A, 10B) accommodated in a case (1) and comprising armature (5), coil bodies (3), magnetisable core (4) and switching plunger (6), whose switching plunger (6) has a switching end which can be coupled to the closing element of a hydraulic valve (33A, 33B) and an actuating end (8) for manual operation, whereby the effective switching lift of the switching plunger (6) is adjustable. The switching plunger (6) is joined to the armature (5) by means of a screwed connection and adjustment of the switching lift is facilitated by a relative rotation between the armature (5) and the switching plunger (6).

11 Claims, 2 Drawing Sheets

ELECTROMAGNET SWITCHING DEVICE

Figure 1:
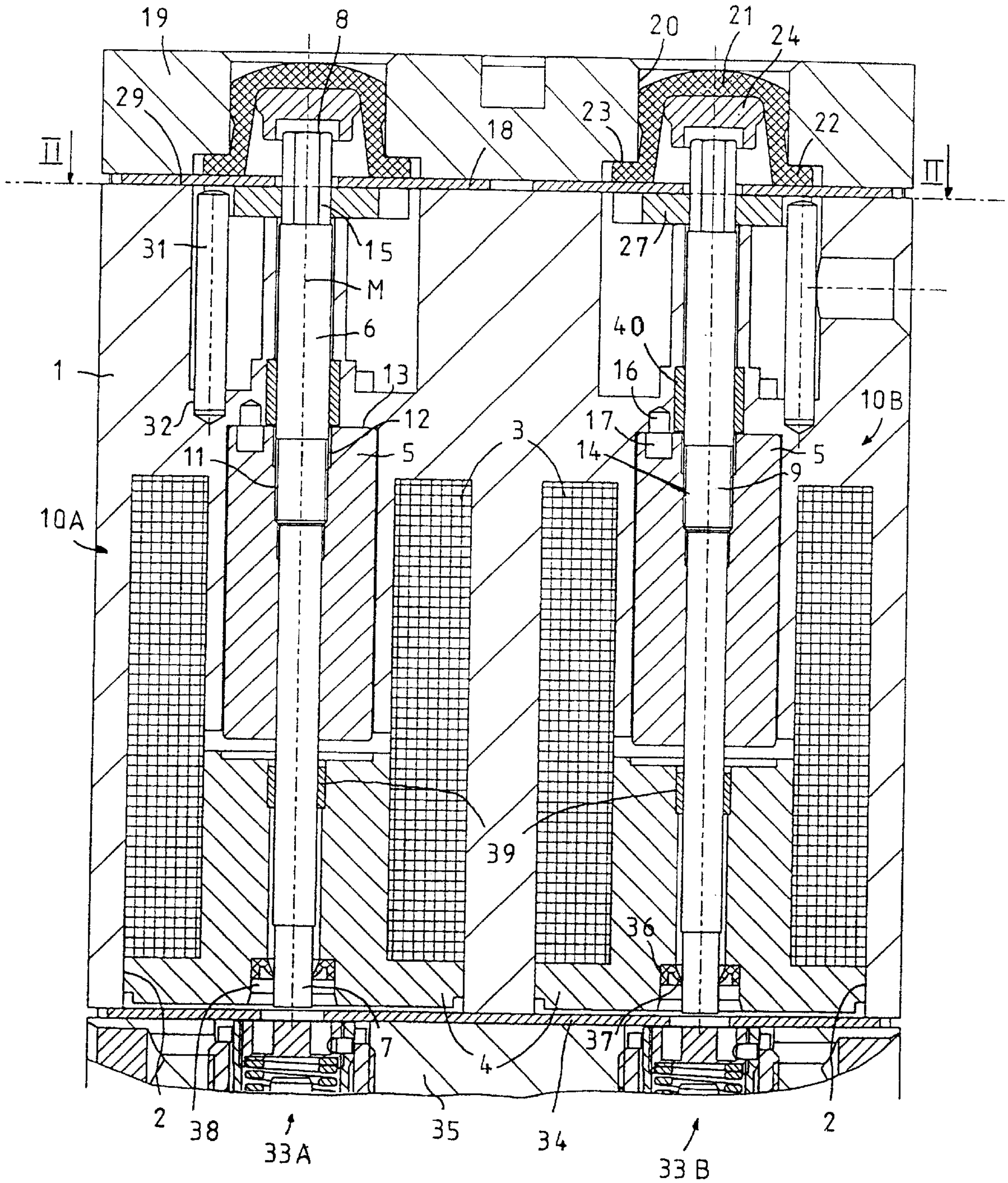

The present invention relates to an electromagnet switching device for hydraulic or electrohydraulic directional control valves, especially applied in advancing supports of underground mining equipments with controllable electromagnets accommodated in a case and comprising armature, coil bodies, magnetisable core and switching plunger, whose switching plunger has a switching end which can be coupled to the closing element of a hydraulic valve and an actuating end for manual operation, whereby the effective switching lift of the switching plunger is adjustable.

DE 38 23 681 A1 describes a previously proposed switching device, whereby here the hydraulic valves are actuated as for instance pilot valves via an actuating lever, which is hinged on and on whose free lever end the switching end of the switching plunger acts. For adjustment the armature is formed as an adjusting shaft and joined secured against rotation with an adjusting screw which is screwed into a threaded hole in the free end of the lever. Owing to the lever translation and the adjusting screw sitting in the lever with a fine thread a delicate adjustment of the switching lift is attained. The setting of the angle of rotation is achieved by means of a star wheel, which can move axially but sits fixed against rotation on the free end of the adjustment shaft forming a manual operating end and can be fixed by a rotation securing element to the case. It has been found that the adjustment can be undertaken via the hand operating end of the electromagnet. It is however a disadvantage that the previously proposed switching device requires a lever.

It is an aim of the present invention to simplify an adjustable electromagnet switching device and to make adjustment possible independently of the presence of a switching lever.

Accordingly the present invention is directed to an electromagnet switching device as described in the opening paragraph of the present specification, in which the switching plunger is joined to the armature by a screwed connection and adjustment of the switching lift is facilitated by a relative rotation between the armature and the switching plunger. In accordance with the invention the effective switching lift, which is adjusted or changed exclusively using the parts always present in any electromagnet, can be set independently of the presence of a lever. In a preferred embodiment the armature is fixed in the case, secured against rotation to facilitate the relative rotation. Advantageously the switching plunger is screwed in centrally in the armature and the securing against rotation comprises a pin, arranged off centre, a guide rib arranged off centre, which interoperates with a guide groove on the outer circumference of the armature, a spring key with associated grooves in the armature and the case or similar. Especially the armature has a boring in its front end facing away from the valve, in which a guide pin fastened to the case engages with low play. Obviously in a mechanical reversal the armature can also have the guide pin and the case the boring.

In a preferred embodiment the armature is formed with a preferably multi-stepped blind hole boring with an internal thread and the switching plunger is made in a single part and has an intermediate section with an outer thread, whereby the inner and outer threads are preferably produced as a fine thread, so that with a large angle of rotation only a relatively small readjustment of the switching path or switching lift is caused, and consequently fine adjustment is possible. Furthermore the blind hole boring with the internal thread and the outer thread on the switching plunger can be produced with a small manufacturing outlay.

For simple performance of the relative rotation between the switching plunger and the armature the actuating end of the switching plunger is preferably provided with a multi edged outer profile, onto which a setting element, especially a fixing and adjusting disc with a matching inner profile sits, which can be turned and fixed to the case, whereby preferably the multi edged profile is a hexagonal profile, so that the actuating end for manual operation forms at the same time the adjusting and fixing end for the setting of the adjustment. For fine adjustment the setting element is preferably divided around its circumference into equiangular indexing elements in the form of indentations and/or perforations and/or protrusions or similar, especially preferred in the form of open cut-outs in the rim, which are associated with an arresting means, preferably an arresting pin fixed or which can be fixed to the case. In the embodiment with the arresting pin fixed onto the case the setting element should sit axially movable on the multi-edge profile, so that even when the setting element is lifted from the arrested position the rotation lock between the setting element and the switching plunger remains assured. With the arresting pin removably fixed in the case axial mobility is not required.

As set out further above, the operating end facilitates manual actuation of the directional control valve, e.g. in emergency situations. Previously, in similar emergency situations damage to the switching plunger could arise for instance owing to too high a switching force. In order to avoid this and at the same time to provide the hand actuation in the simplest manner, preferably the operating end of the switching plunger extends out at each adjustment setting over the operating end of the electromagnet case and a top plate is mounted on the operating side, which is provided with cut-outs so that the rim zones of the cut-outs can form a protective collar for the operating ends of the switching plunger and operating ends of the switching plunger can lie sunk in the cut-outs. Advantageously hat shaped bonnets of a flexible, especially elastic material are retained or fastened in the cut-outs, which preferably enclose a press button such as a brass knob as a protective means for the bonnet and/or the operating end. The bonnet, of elastic material, discharges a sealing function against the rough environmental conditions which prevail in underground mining faces. Damage to the bonnet is prevented by means of the press or brass knob.

In a preferred embodiment the switching plungers of the electromagnets are axially aligned to the central axes of the closing elements of the valves and/or a separation plane is formed between the electromagnet case and the valve block housing the valves. Preferably the switching plunger is guided by means of sliding sleeves in the case and/or the iron core and/or that the switching end of the switching plunger engages through a sealing element with sealing lips, so that the environmental influences prevailing underground, especially moisture, coal dust and similar cannot affect the functional integrity of the electromagnets, their switching plungers and the screwed connection between the armature and the switching plunger.

Figure 2:
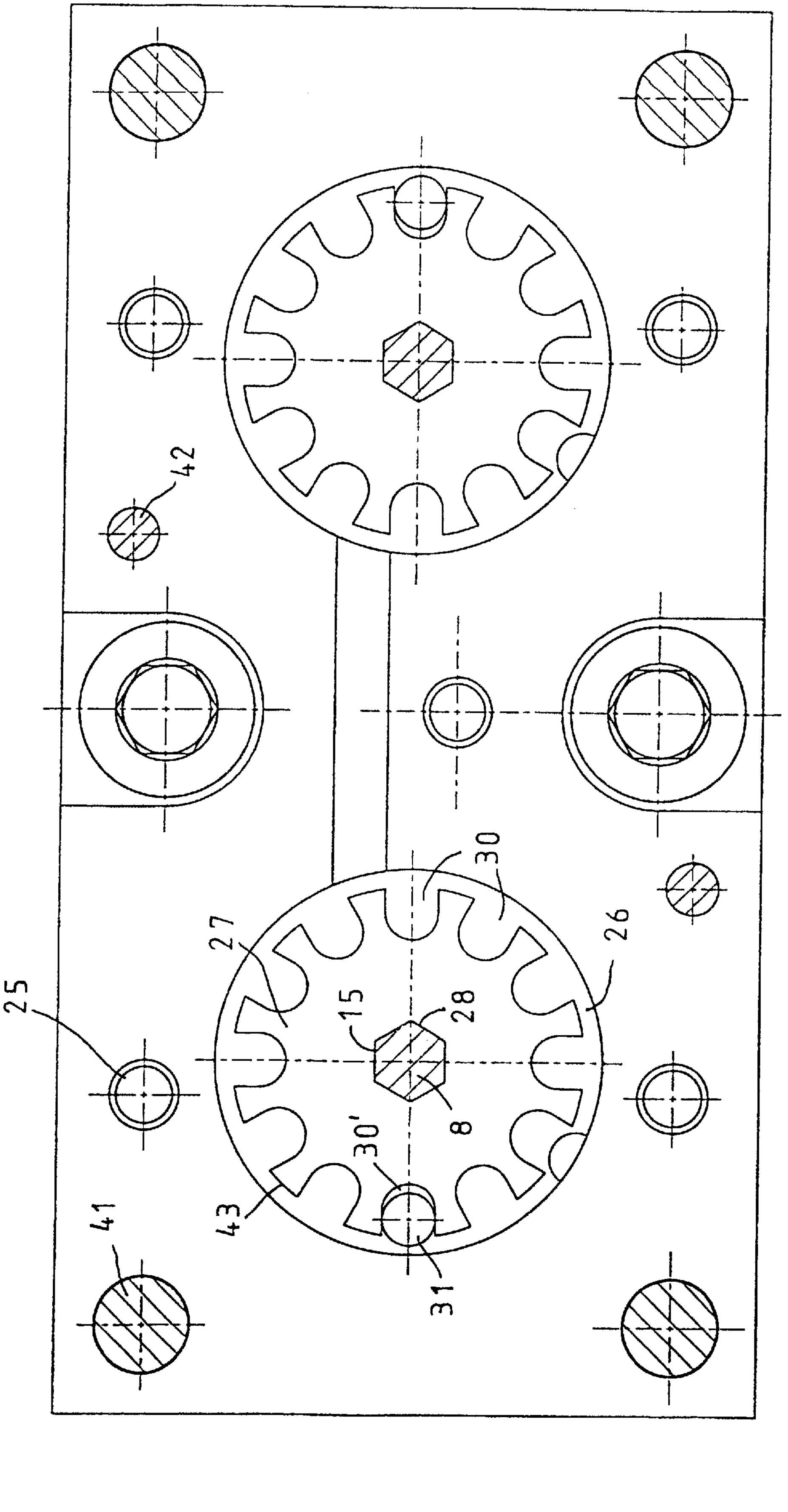

An example of an electromagnet switching device according to the present invention will now be following described hereinbelow in relation to the attached drawings, in which:

FIG. 1 shows a longitudinal section through an electromagnet switching device according to the present invention screwed onto a valve block; and FIG. 2 shows a view along the line II—II in FIG. 1.

FIG. 1 shows a square shaped electromagnet case 1 with two electromagnets 10A, 10B, which are constructed identically to each other and in each case, arranged in an accepting boring 2, include a cylindrical coil body 3, an iron core 4 which is magnetised by the coil body 3, an axially moving armature 5 and a switching plunger 6. The switching plunger 6, preferably constructed as a single part, has, as shown in FIG. 1, a lower switching end 7, and an upper operating end 8, is multiply stepped and provided in an intermediate section 9 with an outer thread 11, which preferably is made as a fine thread with low pitch. The switching plunger 6 is screwed using the outer thread 11 on the intermediate section 9 into a blind hole boring 12 in the armature 5, which is multiply stepped and starting from its upper front side 13 is provided with an internal thread 14, whose pitch is matched to the thread pitch of the outer thread 11. The switching plunger 6 hereby engages centrally in the cylindrical armature 5, so that the central axis M of the switching plunger coincides with the central axis of the inner boring 2, the central axis of the coil body 3 and the central axis of the iron core 4. By turning the switching plunger 6 relative to the armature 5 the extension setting of the switching end 7 of the switching plunger 6 for both end positions of movement can be changed or adjusted. In order to be able to effect a relative rotation between the switching plunger 6 and the armature 5, on the one hand the operating end 8 is provided with a hexagonal outer profile 15, which extends axially over several centimeters and the armature 5 is gripped in via a guide pin, not shown, which at one end is firmly inserted into a hole 16 in the upper front side of the accepting boring 2 and at the other end in a guide boring 17, which is formed in the front side 13 of the armature 5. It can be understood that the length of the pin is so dimensioned that independently of the displacement position of the armature 5 the security against rotation is still effective.

In the retracted movement position of the magnet armature 5 shown in FIG. 1 the switching end 7 of the switching plunger 6 is aligned somewhat with the underside of the electromagnet case 1; the hexagonal profile section 15 actuating end 8 extends over the upper side 29 of the electromagnet case 1 to its maximum extent. With the interposition of a seal 18, a case lid 19 is screwed onto this upper end 29, which has a cut-out 20 for the switching plunger of each electromagnet 10A, 10B, in which the operating end 8 is sunk and in which a hat shaped bonnet 21 of elastic material is retained. The bonnet 21, which is made in the manner of a rolling membrane, has a clamping rim 22, which lies against a cylindrical shoulder 23 of the cut-out 20 and is thus secured against falling out. The bonnet 21 covers a brass knob 24, which protects the inside of the bonnet 21 against damage from the edges of the operating end 8 or the hexagonal profile 15. The bonnet 21 at the same time seals the internal space of the electromagnet case 1 on the operating end or the emergency actuation against the ingress of moisture, coal dust and similar. Between the brass knob 24 and the operating end 8 an intervening space or separation can be provided, so that unintentional disturbance of the bonnet 21 or the knob 24 does not lead to switching of the valve.

The case lid 19 is fastened by screws onto the upper end 29 of the electromagnet case 1, as especially FIG. 2 shows, which are screwed into tapped holes 25 distributed around the upper end 29. The precise positioning of the case lid 19 is for instance assured by several guide pins 41 and 42. FIG. 2 shows also the preferred device used for changing the rotational setting of the switching plunger relative to the magnet armature. As the setting device a setting and fixing disc 27 sunk into a cylindrical counterboring 26 of the case 1 is used, which has centrally an inner cut-out 28 with a hexagonal profile and is joined by this rotationally fixed to the hexagonal profile 15 of the operating end 8 of the switching plunger. On the outer periphery 43 of the disc 27 open cut-outs 30 are formed at regular angular intervals in the rim, whereby an arresting pin 31 engages in one of the cut-outs 30'. When the case lid 19 is removed (FIG. 1) the disc 27 can be moved or lifted axially on the hexagonal profile 15 of the switching plunger 6, and turned, since the cut-outs 30, 30' then come free from the arresting pin 31. When the desired adjustment has been completed, the adjusting and fixing disc 27 can be pushed back, so that now the arresting pin 31 engages in another cut-out 30. As FIG. 1 shows, the arresting pin 31 sits firmly fixed in a retaining hole 32 arranged off-centre in the base of the counterboring 26. The advantage of the arresting pin 31 fastened to the case 1 is inter alia that when making adjustment settings at underground working faces the arresting means cannot be forgotten.

As is further shown in FIG. 1 the electromagnet case 1 is fastened removably onto a valve block 33, in which each electromagnet 10A, 10B is associated with a multi-way directional control valve 33A, 33B with a closing body, not shown. A further head seal 34 is arranged between the valve block 35 and the case 1, so that no moisture and no coal dust can penetrate via the separating plane formed between the valve block 35 and the case 1 into the directional control valves 33A, 33B and the electromagnets 10A, 10B. As an additional protective measure for the screwed connection between the armature 5 and the switching plunger 6 the switching end 7 of the switching plunger 6 engages through a sealing ring 36 with sealing lips 37, which sits in a dedicated central cut-out 38 in the under side of the iron core 4. Secure guidance of the switching plunger 6 in the case 1 and the iron core 4 is effected by sliding sleeves 39, 40. The disc 27 is supported on a cylindrical collar extension 44, which extends out from the base of the counterboring 26.

From the foregoing description a man skilled in the art will derive a row of modifications, which should fall within the scope of the claims. The disc can be joined axially and rotation fast to the actuating end of the switching plunger and the arresting pin can be removed and again inserted. The securing against rotation of the magnet armature can be effected by ribs, spring keys or similar, which engage in corresponding cut-outs in the outer circumference of the magnet armature. The switching plunger can be coupled to the closing elements of the directional control valves via a lever, even if preferably the central axis of the switching plunger is aligned with the central axis of the closing element.

What is claimed is:

1. An electromagnet switching device for hydraulic or electrohydraulic directional control valves, especially applied in advancing supports of underground mining equipment with controllable electromagnets accommodated in a case and comprising armature, coil bodies, magnetisable core and switching plunger, whose switching plunger has a switching end which can be coupled to the closing element of a hydraulic valve and an actuating end for manual operation, whereby the effective switching lift of the switching plunger is adjustable, in which the switching plunger is joined to the armature by means of a screwed connection and adjustment of the switching lift is facilitated by a relative rotation between the armature and the switching plunger.

2. An electromagnet switching device according to claim 1, in which the armature is fixed in the case, secured against rotation.

3. An electromagnet switching device according to claim 2, in which the switching plunger is screwed in centrally in the armature and the securing against rotation comprises a pin, arranged off centre, a spring key or similar.

4. An electromagnet switching device according to claim 2, which the armature has a boring in its front end facing away from the valve in which a guide pin fastened to the case engages with low play.

5. An electromagnet switching device according to claim 1, in which the armature is formed with a preferably multi-stepped blind hole boring with an internal thread and the switching plunger is made in a single part and has an intermediate section with an outer thread, whereby the inner and outer threads are preferably produced as fine threads.

6. An electromagnet switching device according to claim 1, in which the actuating end is provided with a multi edged outer profile, onto which a setting element, especially a fixing and adjusting disc with a matching inner profile sits which can be turned and fixed to the case, whereby the multi edged profile is preferably a hexagonal profile.

7. An electromagnet switching device according to claim 6, in which the setting element is preferably divided around its circumference into equiangular indexing elements in the form of indentations and/or perforations and/or protrusions or similar, especially preferred in the form of open cut-outs in the rim, which are associated with an arresting means, preferably an arresting pin fixed or which can be fixed to the case.

8. An electromagnet switching device according to claim 1, in which the operating end extends out at each adjustment setting over the operating end of the case and a top plate is mounted on the operating side, which is provided with cut-outs so that the rim zones of the cut-outs can form a protective collar for the operating ends of the switching plunger.

9. An electromagnet switching device according to claim 8, in which preferably hat shaped bonnets of a flexible, especially elastic material are retained or fastened in the cut-outs, which preferably enclose a press button such as a brass knob as a protective means for the bonnet and/or the operating end.

10. An electromagnet switching device according to claim 1, in which that the switching plungers of the electromagnets are aligned axially with the central axes of the closing elements of the valves and/or a separation plane is formed between the electromagnet case and the valve block housing the valves.

11. An electromagnet switching device according to claim 1, in which the switching plunger is guided by means of sliding sleeves in the case and/or in the iron core and/or that the switching end of the switching plunger engages through a sealing ring with sealing lips.

* * * * *

UNITED STATES PATENT AND TRADEMARK OFFICE

CERTIFICATE OF CORRECTION

PATENT NO. : 6,616,122 B2 
DATED : September 9, 2003
INVENTOR(S) : Wolfgang Kobow and Michael Dettmers It is certified that error appears in the above-identified patent and that said Letters Patent is hereby corrected as shown below:

Title page,
Item [*] Notice, should read:
-- [*] Notice: Subject to any disclaimer, the term of this patent is extended or adjusted under 35 U.S.C. 154(b) by 28 days. --

Signed and Sealed this

Twenty-seventh Day of January, 2004

JON W. DUDAS
*Acting Director of the United States Patent and Trademark Office*